(12) United States Patent
Park

(10) Patent No.: US 10,981,123 B2
(45) Date of Patent: Apr. 20, 2021

(54) NANO-BUBBLE WATER GENERATING APPARATUS CONTAINING AN APPLICATION GAS

(71) Applicants:IN EUNG CO., LTD., Gyeonggi-do (KR); Jong Hoo Park, Gyeonggi-do (KR)

(72) Inventor: Jong Hoo Park, Gyeonggi-do (KR)

(73) Assignee: IN EUNG CO., LTD., Gyeonggi-Do (KR)

( * ) Notice: Subject to any disclaimer, the term of this patent is extended or adjusted under 35 U.S.C. 154(b) by 165 days.

(21) Appl. No.: 15/956,552

(22) Filed: Apr. 18, 2018

(65) Prior Publication Data

US 2018/0296991 A1 Oct. 18, 2018

(30) Foreign Application Priority Data

Apr. 18, 2017 (KR) .................. 10-2017-0049836

(51) Int. Cl.
*B01F 3/04* (2006.01)
*B01F 5/06* (2006.01)
(Continued)

(52) U.S. Cl.
CPC ............ *B01F 3/04808* (2013.01); *A47K 3/10* (2013.01); *A61H 33/0087* (2013.01);
(Continued)

(58) Field of Classification Search
CPC ...... A47K 3/10; A61H 33/0087; A61H 33/02; A61H 33/6047; A61H 35/006;
(Continued)

(56) References Cited

U.S. PATENT DOCUMENTS

| 7,874,546 B2 | 1/2011 | Park |
| 7,997,563 B2 * | 8/2011 | Abe .................... A01K 63/042 |
| | | 261/78.2 |

(Continued)

FOREIGN PATENT DOCUMENTS

| KR | 100674567 B1 | 1/2007 |
| KR | 100737435 B1 | 7/2007 |

(Continued)

*Primary Examiner* — Charles S Bushey
(74) *Attorney, Agent, or Firm* — Kirton McConkie; Evan R. Witt

(57) ABSTRACT

A nano-bubble water generating apparatus containing an application gas includes a motor, a pump integrated with the motor for supplying liquid, typically water, from an inlet pipe under a predetermined pressure through a supplying pipe to a pressure tank, a nano-bubble water generating tube mounted at the water entrance of a pressure tank, an electronic control portion, a pressure adjuster including an outer air inflowing portion to introduce an outer air or a specific gas supplied thereinto to control a pressure in the pressure tank, uniformly and a pressure adjusting portion airtightly coupled on the upper portion of the outer air inflowing portion to adjust an amount of outer air or specific gas to be supplied, and a nano-bubble water expanding tube for expanding and shattering nano-bubble water through an outlet pipe from the pressure tank, so that the size of the nano-bubble water is better micronized.

3 Claims, 11 Drawing Sheets

(51) Int. Cl.
*B01F 5/20* (2006.01)
*A47K 3/10* (2006.01)
*A61H 33/00* (2006.01)
*B01F 13/10* (2006.01)
*B01F 5/12* (2006.01)
*A61H 35/00* (2006.01)
*A61H 33/02* (2006.01)
*E03C 1/084* (2006.01)

(52) U.S. Cl.
CPC ......... *A61H 33/02* (2013.01); *A61H 33/6047* (2013.01); *A61H 35/006* (2013.01); *B01F 3/04063* (2013.01); *B01F 3/0473* (2013.01); *B01F 3/04503* (2013.01); *B01F 3/04737* (2013.01); *B01F 3/04815* (2013.01); *B01F 3/04985* (2013.01); *B01F 5/0614* (2013.01); *B01F 5/0615* (2013.01); *B01F 5/0693* (2013.01); *B01F 5/12* (2013.01); *B01F 5/20* (2013.01); *B01F 13/1027* (2013.01); *A61H 2033/021* (2013.01); *A61H 2201/5056* (2013.01); *A61H 2201/5071* (2013.01); *B01F 2003/04858* (2013.01); *E03C 1/084* (2013.01)

(58) Field of Classification Search
CPC ...... A61H 2033/021; A61H 2201/5071; A61H 2201/5056; B01F 3/04808; B01F 3/04063; B01F 3/04503; B01F 3/0473; B01F 3/04737; B01F 3/04815; B01F 3/04985; B01F 5/0614; B01F 5/0615; B01F 5/0693; B01F 5/12; B01F 5/20; B01F 13/1027; B01F 2003/04858; E03C 1/084
USPC .............. 261/28, 64.3, 122.1, 123, DIG. 74
See application file for complete search history.

(56) References Cited

U.S. PATENT DOCUMENTS

| | | | |
|---|---|---|---|
| 2004/0124548 A1* | 7/2004 | Rona | B01F 15/00253 261/64.3 |
| 2007/0034556 A1* | 2/2007 | Kamimura | B01F 3/04496 210/97 |
| 2007/0095937 A1* | 5/2007 | Noguchi | B01F 5/10 239/290 |
| 2013/0270722 A1* | 10/2013 | Phillips | B01F 5/0688 261/64.3 |
| 2015/0343399 A1* | 12/2015 | Kim | C10L 1/3328 435/408 |
| 2017/0216794 A1* | 8/2017 | Kamimura | B01F 15/0243 |
| 2017/0218318 A1* | 8/2017 | Kamimura | C12G 1/00 |

FOREIGN PATENT DOCUMENTS

| KR | 100787042 B1 | 12/2007 |
|---|---|---|
| KR | 101027212 B1 | 4/2011 |

* cited by examiner

NANO-BUBBLE WATER GENERATING APPARATUS CONTAINING AN APPLICATION GAS

TECHNICAL FIELD

The invention provides a nano-bubble water generating apparatus constituted as a general micro-bubble generating apparatus, and particularly, to providing a nano-bubble water generating apparatus comprising at least one pressure tank for adjusting a chamber pressure of the pressure tank by supplying an application gas comprising a specific gas such as an oxygen, a hydrogen, a carbon or a nitrogen gas, etc. therein while containing an application gas to be dissolved according to a use purpose.

BACKGROUND TECHNOLOGY OF INVENTION

A various typical prior arts are disclosed in previous registered Korean Patent Nos. 10-0674567 entitled "A fine bubble generating apparatus", 10-0737435 entitled "A fine bubble generating apparatus", 10-0787042 entitled "A fine bubble generating apparatus" and 10-1027212 entitled "An integrated fine bubble generating apparatus". A most typical Patent No. 10-1027212 entitled "An integrated nano-bubble generating apparatus" is an improved invention compared with three cases previously registered as a title "A fine bubble generating apparatus" in common, which is a corresponding U.S. Pat. No. 7,874,546.

That is to say, '567 numbered invention is provided to generate fine micro-bubble water mixing a bathtub water supplied from a bathtub with outer air introduced by a negative pressure in a vacuum chamber by an electronic valve opened and closed in a form of pulse waves. The invention includes a pump mounted between a water supply pipe of the bathtub and a pressure tank to supply the water to the pressure tank, an air supply pipe installed between the pump and a water supply valve for supplying the outer air to the water supply pipe, a spray nozzle installed on the end portion of the water supply pipe to spray a mixing water containing outer air from the pressure tank and the vacuum chamber provided to introduce the outer air thereinto by the negative pressure in a form of pulse waves with being opened and closed via the electronic valve.

The invention generates mixing water containing a larger amount of fine bubbles in a manner that mixing water containing outer air from the vacuum chamber to be introduced thereinto by the electronic valve along with water passing troughs the supply valve is first pressurized by the pump and then supplied to the pressure tank with being kept in a negative pressure state via the supply pipe. But because the supply of the outer air generated from the vacuum chamber and the pressure to be formed in the pressure tank are limited to a predetermined degree, the mixing water generated in the pressure tank is not able to generate the fine micro-bubble water containing sufficient amount of fine micro-bubbles. Due to it, the invention must be depended on a separate injection nozzle suggested herein for its compensation.

Such like configuration does not use a timing control pump and particularly makes the outer air unexpectedly introduced into the vacuum chamber and/or the supplying pipe if the power source is turned off for a long period, since the supply air valve itself is an electronic switching valve. It relatively delays the bubble generation resulted from deteriorating the product performance.

Furthermore, since the pump operation as well as the real time check and the control of the supplying air situation via the electronic control portion are required, the complexities due to the electronic control circuit, the valve connection wiring and the sensor installation often cause the failure of a system. The use of a high-priced and high-speed electronic supplying air valve raises the unit cost of a product.

The fine micro-bubble generating apparatus has disadvantages in that the supplying air valve or vacuum chamber is unavoidable to introduce alien substances therein, since the outer air is directly introduced thereinto without being filtered, and it often happens the trivial malfunctioning of the system and needs the frequent maintenance in general.

A '435 numbered invention further includes a water balance level between a water pump and a pressure tank comparing with the technical configuration of the '567 numbered invention, so that the water feeding even at the time of a fine micro-bubble generating apparatus being stopped is maintained until reaching over a predetermined amount of water in the pressure tank. It enables the use of the supplying water stored to execute the generation of the fine bubbles by the pump, immediately, at the time of being re-operated.

Nevertheless, like the prior registered invention the '435 has disadvantages in that since the pump operation as well as the real time check and electronic control of the supplying air situation are required, the complexity of the electronic control circuit, the valve connection wiring and the sensor installation causes the frequent malfunctions of a system and the maintenance and service are often required in general.

A '042 numbered invention includes further an air purification filter connected to the entry of an air supply tube to purify outer air and an air supply control valve arranged between the air purification filter and a vacuum chamber to receive the change of a water pressure from the pump transferred through a water pressure acting tube comparing with the technical configuration of the '435 numbered invention, Herein, the air supply valve detects the water pressure of the pump from the water pressure acting pipe connected to a connection pipe. And based on the water pressure detected, a predetermined amount of purification air from the air purification filter is supplied to the vacuum chamber.

With such like a configuration, the registered invention has advantages in that the inner pressure of the pressure tank is not only maintained at a constant level, but also a constant amount of fine bubbles is generated, thereby stabilizing a system. But the system must be waited for a predetermined time period from the time point of starting the system until the pressure in the pressure tank reaches a constant value. It results in deteriorating the commodity quality.

As shown in FIG. 1, '212 numbered invention is related to an integrated nano-bubble generating apparatus 10 includes a power portion 20 and a nano-bubble generating portion 40. The power portion 20 is operated under the system control of an electronic control portion 1. The electronic control portion 1 operate a pump 3 with starting a motor 2 to introduce water into an inlet pipe 4 and then through a purifying filter 5 into the inner portion of the pump 3. At the same time, the electronic control portion 1 opens an electronic valve 6 and a second vacuum chamber 8 to supply outer air from an air supplying pipe 7 and pressurizing air via a check valve 9 into the pump 3. The pump 3 mixes water with airs and then supplies mixing water to a pressure tank 11 in the bubble generating portion 30.

The bubble generating portion 30 includes a power control portion 12 for controlling the operation of a system, independently. The power control portion 12 controls a three directional electronic valve 13 to introduce inflowing water from the inlet pipe 4 into the pressure tank 11, directly, and further operates a pressure sensing portion 14 to sense a water pressure in the inlet pipe 4 and judge whether the motor 2 is operated. The power control portion 12 also operates a first vacuum chamber 15 to supply pressurized outer air through the check valve 16 and an air spraying nozzle 18 to the pressure tank 11. The pressure tank 11 provides mixing water containing a large amount of nano-bubbles or nano-bubble containing water through a bubble expanding nozzle 17 to users, in which the bubble expanding nozzle 17 is a spraying nozzle adapted to a shower.

In connection with such like a system, a bubble generating control portion 40 is mounted on the lower portion of the pressure tank 11 so that the pressure tank 11 generate mixing water containing a larger amount of nano-bubbles a bubble expanding nozzle 17.

The bubble generating control portion 40 includes an upside-down T-shaped body, in the vertical portion of which there are formed a first guide passage 21 guiding inflowing water from an inlet pipe 4 into the pressure tank 11 and a second guide passage 22 guiding mixing water containing nano-bubbles from the pressure tank 11 into an outlet portion. In a horizontal portion under the vertical portion of the first and second guide passages 21 and 22, there is formed a cylinder 23. The cylinder 23 includes a piston 25 elastically supported by a spring 24 therein, a first communicating port 27 communicated with the first guide passage 21 at the front of the piston 25 and a second communicating port 28 communicated with the second guide passage 22 at the rear of the piston 25. Therefore, the piston 25 closes a discharging port to block the second communication port 28 if the drinkable water inflowing from the inlet pipe 4 has a pressure of over 1.5 $Kg/cm^2$. The pressure tank 11 is constituted as a vacuum chamber 35 having a predetermined negative pressure, on the upper surface of which an air check valve 34 is mounted to form the negative pressure in the pressure tank 11 with the spray nozzle 18.

A micron water generator 31 is mounted adjacent to the outlet port for the inflowing water of the first guide passage 21. The micron water generator 31 includes a hollow pipe 33 having a height somewhat smaller than the inner full length of the vacuum chamber 35 and a threaded net member 32 mounted into the hollow pipe 33, at the upper end of which a nozzle hole 36 is formed. In the inlet port for mixing water of the second guide passage 22 there is mounted a distributing orifice 26. The distributing orifice 26 also shatters the nano-bubbles containing water in a more minute size, finally, and includes a minute hole in the center and a number of grooves formed around the circumference thereof.

The integrated nano-bubble generating apparatus is provided with the first and second vacuum chambers to mix water supplied from the pump with pressurized air through two phases, supply the mixing water to the bubble generating control portion and then pass through the micron water generator, thereby producing mixing water containing a larger amount of nano-bubbles much more shattered.

The integrated nano-bubble generating apparatus has its use purpose limited in making drinkable water or bath water into mixing water containing nano-bubbles. The integrated nano-bubble generating apparatus controls the power and operation of a system, separately, but the system becomes complex with being provided with at least one control portion and at least one chamber and is not economical due to the high production cost. Further, it is difficult to maintain and manage the conventional fine bubble generating apparatuses and diversify their use purpose.

Furthermore, the generation of general nano-bubble water has been tended to be dependent on the pressure change of the vacuum chamber. Namely, the pressure change of the vacuum chamber causes not only the erroneous operation or the velocity change but also due to the difference of the discharging position of the nano-bubble water and the system position failed to uniform the micron size of the nano-bubble and an amount of the nano-bubble generation.

In light of these and those points, it is very preferable if a nano-bubble water generating apparatus produces a nano-bubble water resolving a specific gas, for example oxygen, hydrogen or nitrogen, etc., the pressure of a vacuum chamber is uniformly maintained according to the supply of the specific gas, the change of a production amount of nano-bubble water is reduced and the uniform quality of the nano-bubble water is maintained regardless of the difference of the mounting position of a system and the supplying position of a nano-bubble water thereby to enhance the system performance. It is very preferable if the configuration of a system is simplified, the use purpose is diversified and the maintenance and service are convenient.

Subject of Invention to be Solved

A main object of the invention is to provide a nano-bubble water generating apparatus containing an application gas for adjusting a pressure in a pressure tank as well as enlarging the application range of a system utilizing any one of application gases including specific gases such as Oxygen, Hydrogen, Nitrogen and Carbon, etc. and simplifying the configuration of the system, innovatively, whereby to uniform the quality of nano-bubble water and produce a constant amount of the nano-bubble water without being changed.

Another object of the invention is to provide a nano-bubble water generating apparatus containing a specific application gas for generating a predetermined amount of nano-bubble water without being changed, in which it generates a larger amount of the nano-bubble water containing any one of specific gases such as Oxygen, Hydrogen, Nitrogen and Carbon in an outer air and is applicable to a system of an industrial application equipment and machine corresponding with the purpose of bath water, vegetation growing water, etc. practicable to agriculture.

Another object of the invention is to provide a nano-bubble water generating apparatus containing an application gas for generating a predetermined amount of nano-bubble water without being changed, in which it generates an oxygen water bubble, a hydrogen water bubble, a carbon water bubble, etc. according to the use purpose and is applicable to a small home appliance equipment and machine corresponding with the purpose of drinkable water or purifying water.

Means for Resolving Subject

According to one embodiment of the invention, a nano-bubble water generating apparatus comprises a motor, a pump integrated with the motor for supplying liquid, typically water from an inlet pipe under a predetermined pressure through a supplying pipe to a pressure tank, a nano-bubble water generating tube mounted at the water entrance of a pressure tank, an electronic control for controlling all system, a pressure adjuster including an outer air inflowing portion introducing thereinto an outer air or a specific gas supplied to control a pressure in the pressure tank, uniformly, and a pressure adjusting portion airtightly coupled on the upper portion of the outer air inflowing portion to adjust an amount of outer air or specific gas to be supplied and a nano-bubble water expanding tube finally expanding and shattering nano-bubble water through an outlet pipe from the pressure tank, so that the size of the nano-bubble water is further micronized.

A nano-bubble water generating tube is directly connected to a water inflowing port of the pressure tank, in which a hollow pipe is horizontally mounted to have a height smaller than an inner full length of tea vacuum chamber and a threaded net member inserted thereinto, a nozzle hole formed at the one end thereof and a plurality of fine nozzle holes in various shapes around the circumferential wall thereof.

An outer air inflowing portion comprises a cup portion, a space formed at its center, an inflowing passage connected to an inlet pipe to introduce outer air into the space, an outputting passage formed to output the outer air through an outputting pipe and a cylindrical inducing tube forming a spring seat and a nozzle at the center in a body of a predetermined height to communicate the inflowing passage with the outputting passage.

A valve includes the supporting plate positioned on the upper circumference of the cup portion to seal the space and define the boundary between the outer air inflowing portion and the pressure adjusting portion; a sealing member including a leg portion having a pointed end to close/open the nozzle with being inserted into the outer air inducing tube along with the spring, a cross portion elastically supported by the spring rightly adjacent to the lower of the supporting plate and a threaded portion integrally extended upward from the supporting plate and forming the screw portion on the upper end thereof; and a head portion coupled with the threaded portion that is projected from the upper portion of the cross member and including an adjacent member closely contacted against the upper surface of the supporting plate.

A pressure adjusting portion includes a lower portion forming a lower flange to be coupled with the upper flange of the outer air inflowing portion and forming a double hollow space to receive the head portion; an upper portion extended in a smaller diameter from the upper portion, in an inner of which a hexagonal body is formed to receive hexagonal nut and on the outer circumference of which a threaded portion is formed; a rotational portion including a rotator screwed to the outer threaded portion of the upper portion to move up and down along the length portion thereof, a moving member coupled with a driving shaft of a micro motor which is provided on the upper portion of the rotator and mounted in an inner wall which is extended downward from the inner center of the rotator and a rotating screw portion coupled to the lower of the moving member, on the outer circumference of which the hexagonal nut is rotatable mounted, and including a screwed member inserted into a threaded hole at the center of the head portion.

A shattering structure comprises a first main body including a lower body formed in a screw part to be coupled with the intermediate wall, a flange forming the boundary between the lower part and an upper body extended at a predetermined distance from the flange, on the upper surface of which a first slit is formed. The lower body includes a first retainer retaining a circular metal plate, at the center of which an orifice of a fine hole is formed to spread nano-bubble water at a high speed and on the circular circumference of which an outer frame made of an elastic material such as a silicon, etc. is provided, a second retainer including another frame made of an elastic material configured to retain a first fine net thereby to shatter the nano-bubble water in a fine minute and a shattering member of a cap form including an upper frame on which another fine second net is mounted and a circular body integrally extended downward from the upper frame, on the circumference of which several second slits are formed, to spread and shatter the nano-bubble water at the same time.

A nano-bubble water generating apparatus comprises a motor, a pump integrally coupled to the motor for introducing a liquid to be induced and pressurized in a constant pressure from an inlet pipe through water supplying pipe to pressure tanks, a nano-bubble water generating tube mounted at a water inlet port of the pressure tank, an electronic control portion for controlling all system, the pressure tanks mounted on a bracket with at least two being connected at their lower portion to each another, an inlet portion inducing an outer air and/or a specific gas to control the pressure in at least two pressure tanks directed to each another, a pressure adjuster including a pressure adjusting portion air-tightly and closely coupled to the upper portion thereof for adjusting an amount of an outer air and/or a specific gas to be supplied and a nano-bubble water and a nano-bubble water expanding tube for finally expanding and shattering the nano-bubble water passing though the discharging pipe from the pressure tank to be minimized in much more small minute.

The nano-bubble water outputting tube comprises a second main body connected to a discharging pipe at one end thereof, on the outer circumference of which a screwed portion is formed; a third retainer including a frame made of an elastic material to surround a circular metal plate, at the center of which a second orifice is formed, a fourth retainer including a frame made of an elastic material such as silicon, etc. to surround a fine metal net and finely shatter diffused nano-bubble water and an outputting portion including a cylindrical ring of a predetermined length for diffusing shattered nano-bubble water and a narrowed end for strongly outputting nano-bubble water and a sealing ring inserted and sealed therein with being coupled to the threaded portion of the second main body, the end portion of which is narrowed, in which the third retainer, the fourth retainer and the cylindrical ring are positioned in the second body and the outputting portion threaded to each other in turns to process the nano-bubble water.

According to another embodiment of the invention, a nano-bubble water generating apparatus comprises a motor, a pump integrally coupled to the motor for supplying a liquid under a predetermined pressure through a supplying pipe to a pressure tank, an electronic control portion for controlling all system, a pressure adjuster including an outer air inflowing portion for supplying an outer air and/a specific gas into the pressure to uniformly maintain the pressure therein and a pressure adjusting portion air-tightly and closely coupled to the upper portion of the outer air inflowing portion to adjust an amount of outer air to the pressure tank to be supplied, a nano-bubble water outputting tube for finally expanding and shattering the nano-bubble water passing through the discharging pipe from the pressure tank to be in a more fine particles and first and second electrolyte gas generating portions for generating an oxygen gas ($O_2$) and/or an hydrogen ion ($H^+$), which are constituted as an electrolyte device of a two compartment cell and a three compartment cell.

The first electrolyte gas generating portion includes a storage tank for supplying a raw water, a dielectric diaphragm electrolyte cell of a two compartment type, a dielectric diaphragm mounted between the dielectric diaphragm electrolyte cells, a first anode chamber provided with an anode electrode therein and a second cathode chamber provided with an cathode electrode therein, to any one of which raw water is supplied to generate oxygen gas ($O_2$) and/or hydrogen ion ($H^+$).

The first electrolyte gas generating portion includes a storage tank for supplying a raw water, a dielectric diaphragm electrolyte cell of a two compartment type, a dielectric diaphragm mounted between the dielectric diaphragm electrolyte cells, a first anode chamber provided with an anode electrode therein and a second cathode chamber provided with an cathode electrode therein, to any one of which raw water is supplied to generate oxygen gas ($O_2$) and/or hydrogen ion ($H^+$).

Effect of Invention

The invention can determine the pressure in a pressure tank by an outer air, in which the outer air may be a specific application gas, for example Oxygen, Hydrogen, Nitrogen, Carbon gas, expand the application range utilizing any one of the application gases, innovatively simplify the configuration of a system to produce a constant amount of a nano-bubble water without being fluctuated. The invention is adaptable to a system of industrial appliance coinciding with the purpose of a bath water; vegetable raising water applied to an agriculture, etc., as well as to a small home appliance system coinciding with the purpose of drinkable water or a purifying water, etc. containing oxygen water bubbles, hydrogen water bubbles, carbon water bubbles according to the use purposes.

BRIEF DESCRIPTION OF DRAWINGS

The invention will be described in detail with reference to the accompanied drawings as follows.

DETAILED DESCRIPTION OF INVENTION

Figure 1:
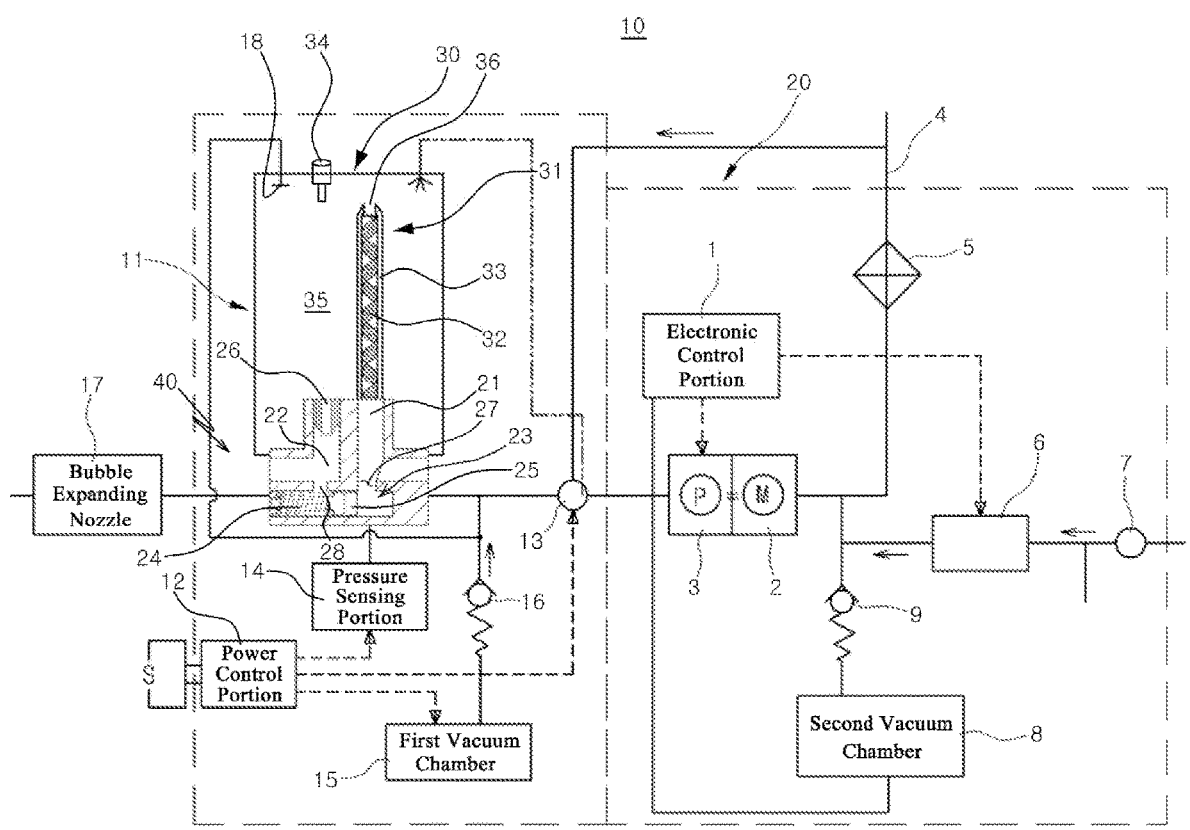
FIG. 1 is a block diagram illustrating the configuration of an integrated nano-bubble generating apparatus according to a prior art.
Figure 2:
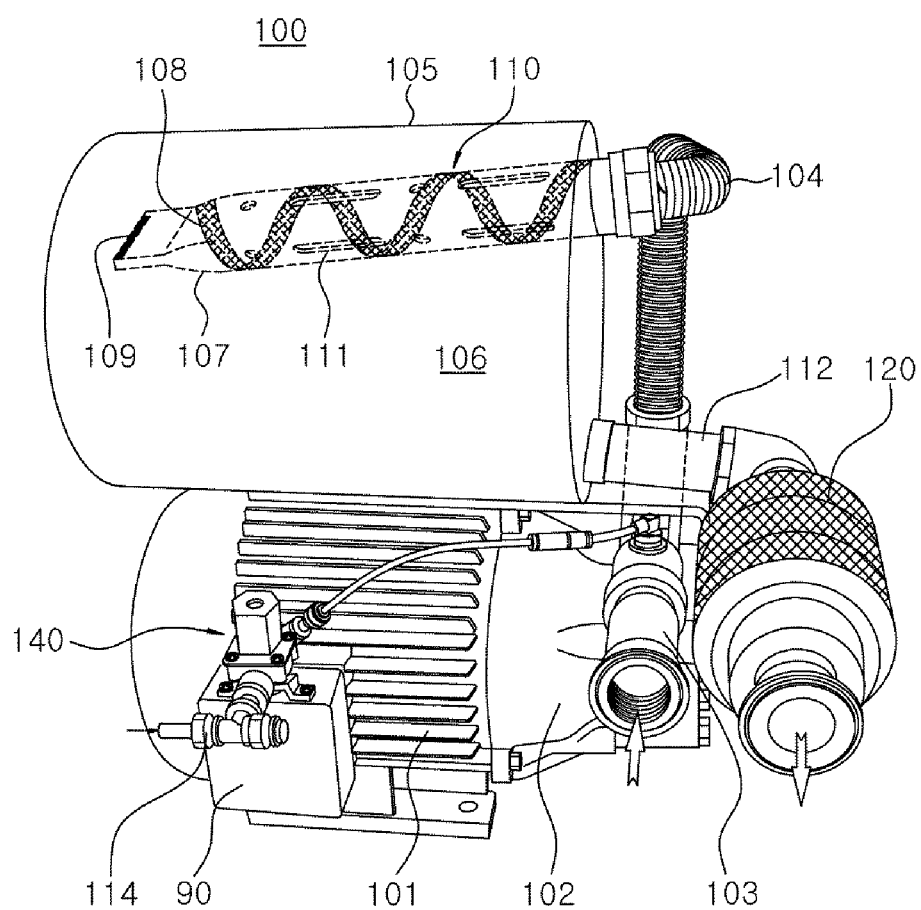
FIG. 2 is a perspective front view illustrating the assembly of the important parts in a nano-bubble water generating apparatus containing an application gas according to one embodiment of the invention.
Figure 3:
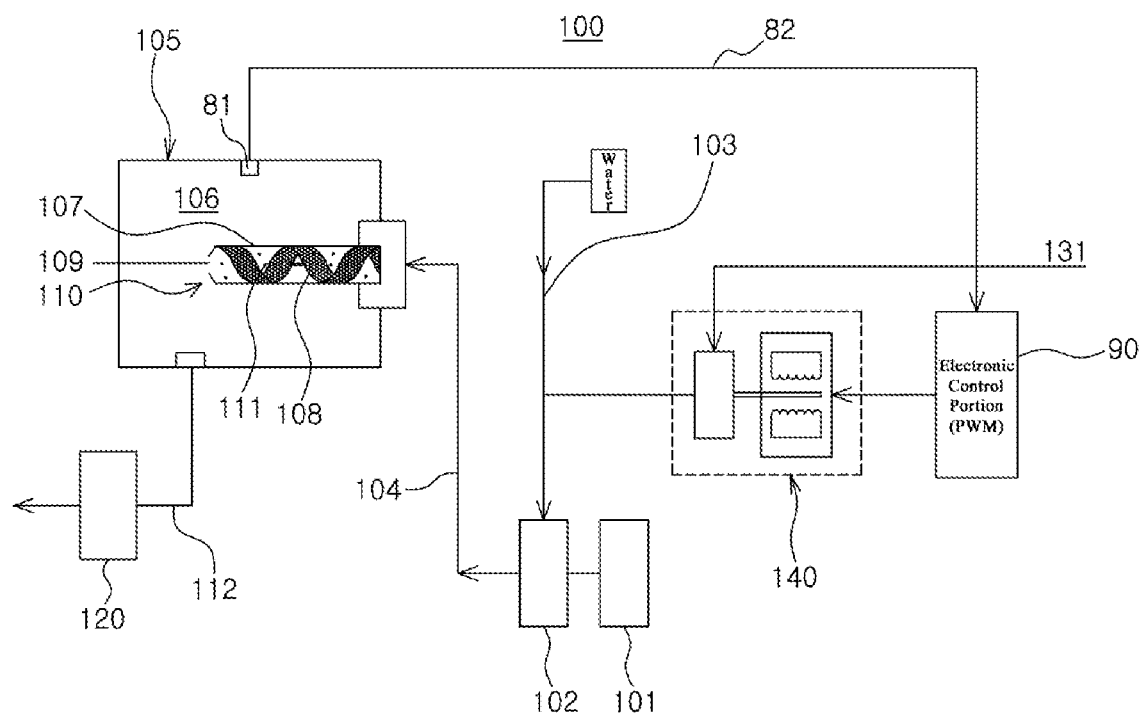
FIG. 3 is a block diagram schematically illustrating the configuration of the nano-bubble water generating apparatus containing an application gas according to one embodiment of the invention.

As shown in FIGS. 2 and 3, according to one embodiment of the invention a nano-bubble water generating apparatus 100 comprises a pump 102 integrated adjacent to a motor 101. The pump 102 supplies liquid, typically water from an inlet pipe 103 through a supplying pipe 104 under a predetermined pressure to a pressure tank 105.

The nano-bubble water generating apparatus 100 further comprises a pressure adjuster 140 for adjusting the pressure of a vacuum chamber 106 in a pressure tank 105 to generate nano-bubble water resolving an outer air or a specific gas, for example Oxygen, Hydrogen, Nitrogen, Carbon, etc., an electronic control portion 90 for controlling a total system including the pressure adjuster 140 and a nano-bubble generating water tube 110 mounted at the water entrance of the pressure tank 105 to generate nano-bubble water better micronized, in which the electronic control portion 90 receives a sensing signal from a pressure sensing sensor 81 through an inputting line 82 in order to confirm the pressure of the pressure tank 105.

The nano-bubble water generating tube 110 is directly connected to the water inflowing port of the pressure tank 105 and includes a hollow pipe 107 having a height somewhat smaller than the inner full length of the vacuum chamber 106, a threaded net member 108 inserted into the hollow pipe 107, at the upper end of which a nozzle hole 109 is formed, and a plurality of fine hole 111, such as circle, rectangular, triangle, etc. in various shapes or somewhat longer hole as shown in the figure on the wall around the circumference thereof. Herein, it is noted that the hollow pipe 107 is horizontally mounted, and the fine holes 111 has a diameter of 0.1 mm to 0.3 mm or even the longer hole is 0.5 mm.

Therefore, according to the invention the nano-bubble water generating apparatus 100 supplies water through the inlet pipe 103 from an outside to the pressure tank 105 in a manner that the pressure adjuster 140 adjusts the pressure of the outer air or application gas such as Hydrogen, Oxygen, etc. from a gas feeding pipe 80 and then feeds the adjusted application gas to the pump 102 in order to adjust the pressure in the vacuum chamber 106 as well as generate the nano-bubble water containing the specific gas.

That is to say, the pressure tank 105 is maintained at the pressure adjusted by the feeding gas from the gas feeding pipe 114 introducing an outer air or a specific gas such as Oxygen, Hydrogen, Nitrogen, etc. thereinto. The water introduced into the pressure tank 105 from the gas feeding pipe 114 is kept at a predetermined pressure, while the water and the specific gas passing through the nano-bubble water generation portion 10 are mixed with each other and be shattered and sprayed in it, thereby generating the nano-bubble water. The nano-bubble water is processed passing through a nano-bubble water expanding tube 120 from a discharging pipe 112. The nano-bubble water expanding tube 120 processes the nano-bubble water discharged from a system to be much more shattered as follows.

Figure 4:
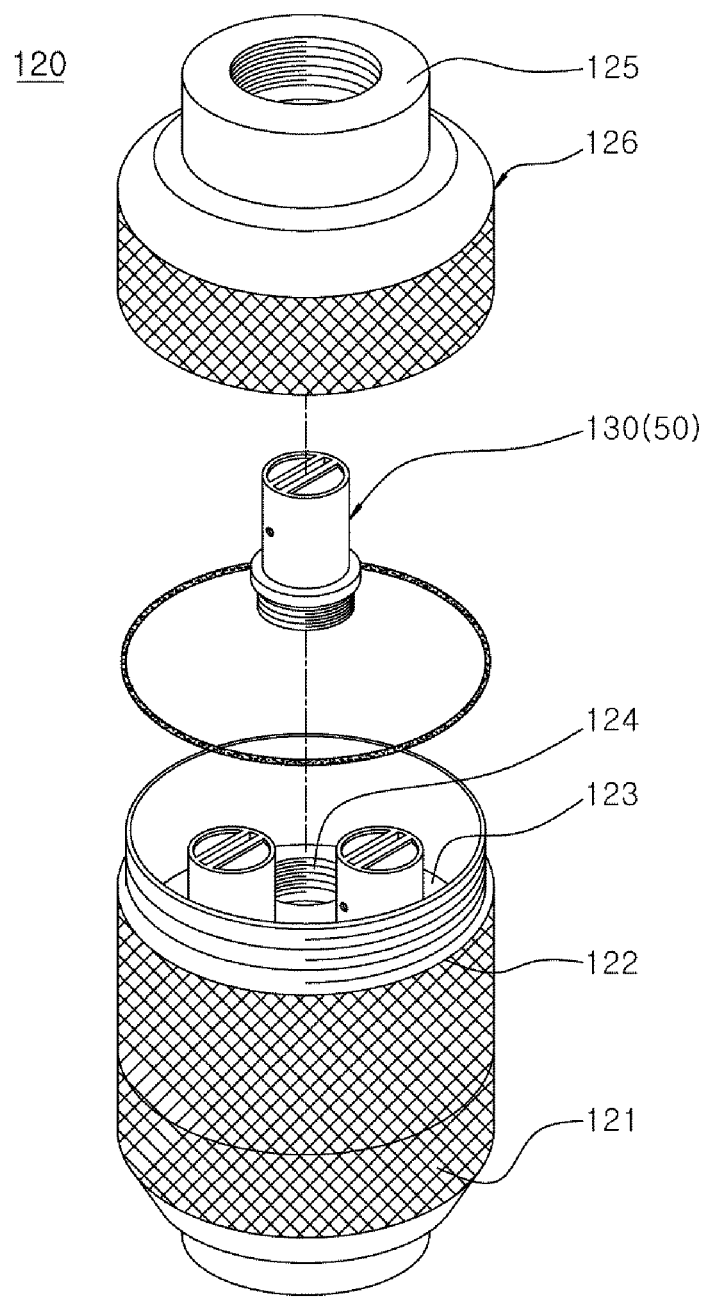
FIG. 4 is an exploded perspective view illustrating a nano-bubble water expanding tube of the nano-bubble water generating apparatus containing an application gas according to one embodiment of the invention.

As shown in FIG. 4, the nano-bubble water expanding tube 120 finally expands and shatters the nano-bubble water passing though the discharging pipe 112 from the pressure tank 105 to be made in a more minute size.

The nano-bubble water expanding tube 120 includes an entrance portion 121 hollowed therein; a volume portion 122 threaded to the outside of the entrance portion 121 including an intermediate wall 123 formed on the inner portion thereof, at least two holes 124 perforated on the intermediate wall 123, for example three holes 124 and a shattering structure 130 (50) mounted into the holes 124 to expand and shatter the nano-bubble water, thereby being made in a more minute size; and an outlet portion 126 thread-coupled with the volume portion 122 and including an outlet port 125 of a small diameter narrowed from a volume in a same size adjacent to the volume portion 122.

Figure 5:
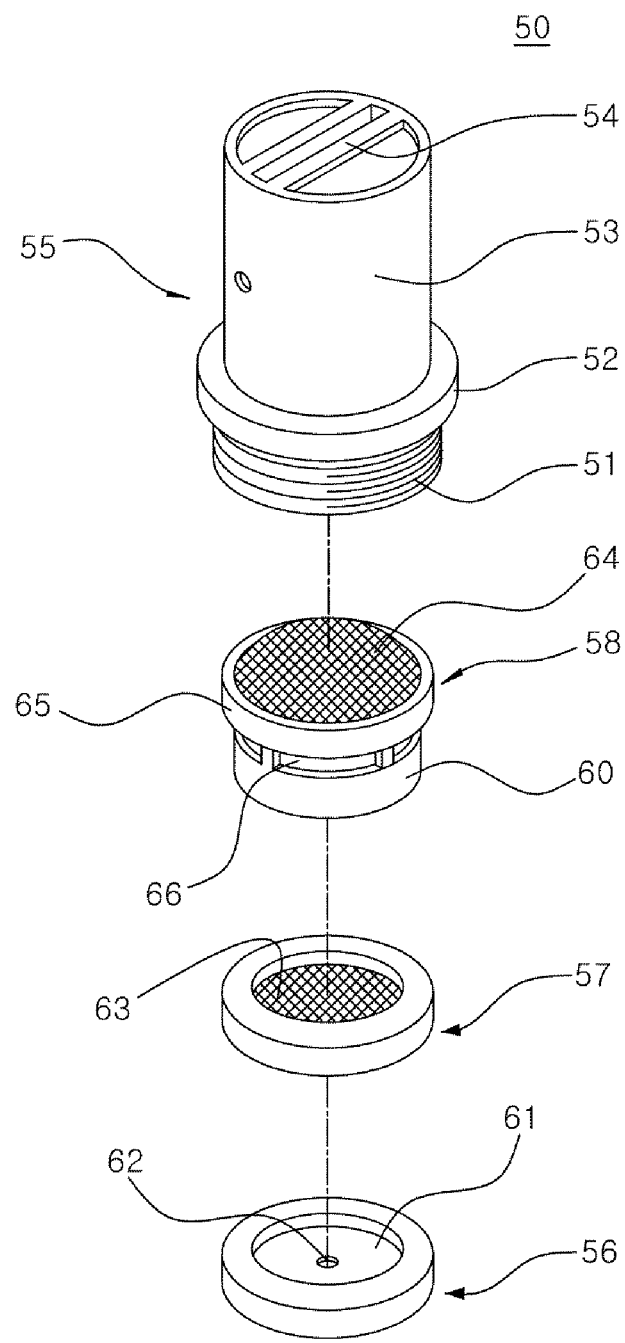
FIG. 5 is an exploded perspective view illustrating a shattering member in the nano-bubble water expanding tube of the nano-bubble water generating apparatus containing an application gas according to one embodiment of the invention.

As shown in FIG. 5, the shattering structure 50 comprises a first main body 55 including a lower body 51 forming a screw part on the outer of the cylindrical portion thereof to be coupled with the intermediate wall 123, a flange 52 forming a boundary between the lower part 51 and an upper body 53 extended at a predetermined distance from the flange 52, on the upper surface of which a first slit 54 is formed. The lower body 51 includes a first retainer 56 retaining a circular metal plate, at the center of which an orifice 62 of a fine hole is formed to spread nano-bubble water at a high speed and on the circular circumference of which an outer frame made of an elastic material such as a silicon, etc. is provided, a second retainer 57 including another frame made of an elastic material configured to retain a first fine net 63 thereby to shatter the nano-bubble water in a fine minute size and a shattering member 58 of a cap form including an upper frame 65 on which another fine second net 64 is mounted and a circular body 60 integrally extended downward from the upper frame 65, on the circumference of which several second slits 66 are formed, to spread and shatter the nano-bubble water at the same time.

Therefore, the nano-bubble water expanding tube 120 discharges a nano-bubble water of a resulting product. For example, water is first supplied through the inlet pipe 103 from the outside and then through the pump 102 to the pressure 105. The pressure adjuster 140 forces a specific gas from the gas feeding pipe 114 to be supplied through the pump 102 to the pressure tank 105 in order to adjust the pressure of the vacuum chamber 106. In the pressure tank 105, the specific gas and the supplied water are mixed with each other, shattered in a fine minute size and expanded passing through the hollow pipe 107 thereby to generate nano-bubble water. The nano-bubble water is discharged as nano-bubble water containing an application gas to be resolved therein in the process of being diffused, shattered, expanded and shattered as well as diffused passing through the nano-bubble water expanding tube 120 from the discharging pipe 112.

Figure 6:
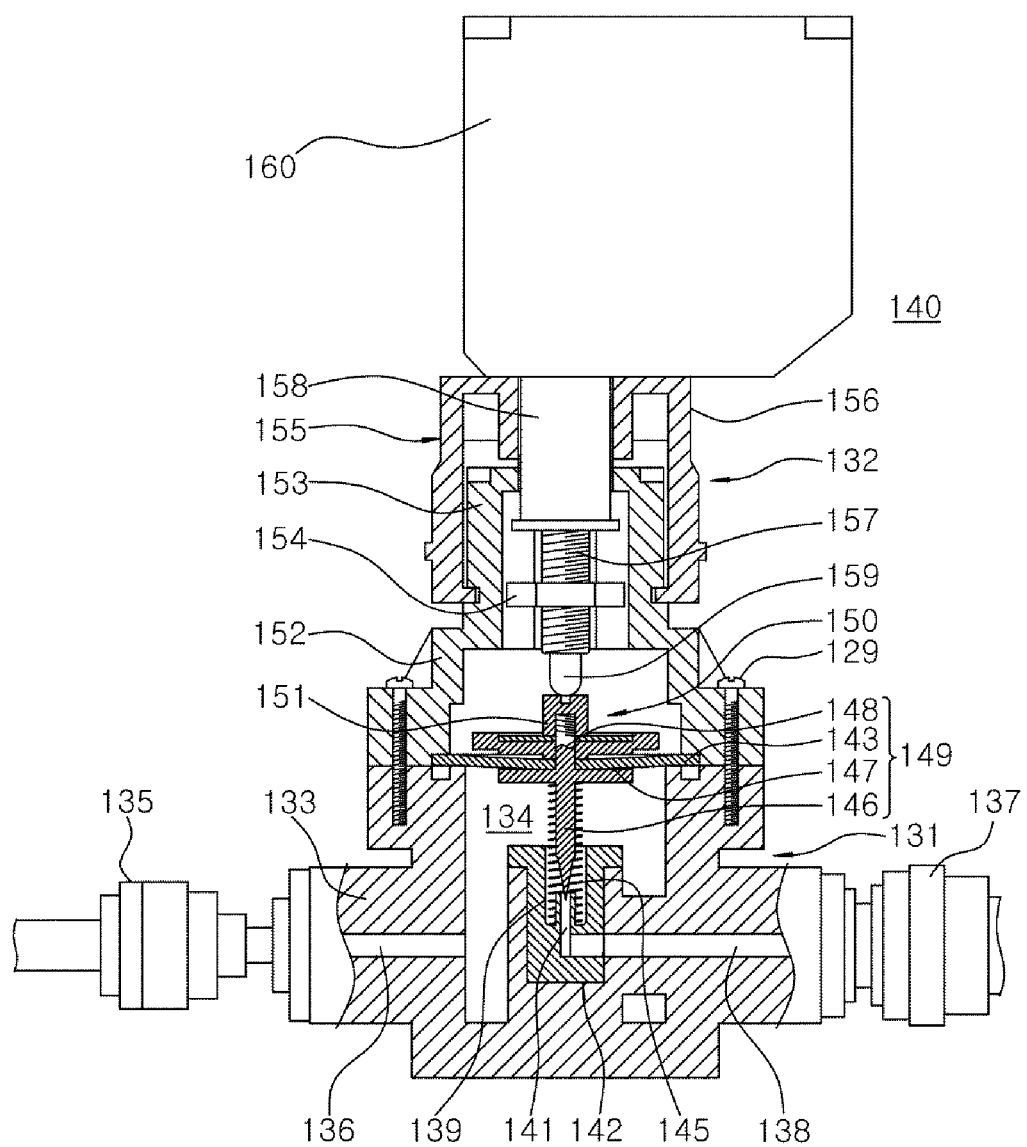
FIG. 6 is a cross-sectional view illustrating a pressure adjuster for adjusting the pressure of a specific gas to be supplied to a pressure tank in a nano-bubble water expanding tube of the nano-bubble water generating apparatus containing an application gas according to one embodiment of the invention.

As shown in FIG. 6, according to a pressure adjuster 140 is adapted to a pressure tank 105 to maintain a vacuum chamber 106 at a predetermined pressure, thereby uniformly keeping a predetermined particle size and generating amount of the nano-bubbles regardless of obstacles due to outer factors.

The pressure adjuster 140 comprises an outer air inflowing portion 131 and a pressure adjusting portion 132 airtightly and closely coupled to the upper portion of the outer air inflowing portion 131 by screws 129 to adjust a supplying amount of outer air to a pressure tank.

The outer air inflowing portion 131 includes a cup portion 133, a space 134 formed therein, an inflowing passage 136 connected to an inlet pipe 135 to introduce outer air into the space 134, an outputting passage 138 formed to output the outer air through an outputting pipe 137 and a cylindrical inducing tube 142 forming a spring seat 139 and a nozzle 141 at the center in a body of a predetermined height to communicate the inflowing passage 136 with the outputting passage 138.

The outer air inflowing portion 131 includes a supporting plate 147 positioned on a shoulder around the upper circumference thereof and a sealing member 149 mounted therein to close/open the nozzle 141 of the inducing tube 142. A valve 150 includes a head portion 151 mounted over the supporting plate 147 in a pressure adjusting portion 132 as described later.

That is to say, The valve 150 includes the supporting plate 147 positioned on the upper circumference of the cup portion 133 to seal the space 134 and define the boundary between the outer air inflowing portion 131 and the pressure adjusting portion 132; sealing member 149 including a leg portion 146 having a pointed end to close/open the nozzle 141 with being inserted into the outer air inducing tube 142 along with the spring 145, a cross member 143 elastically supported by the spring 145 rightly adjacent to the lower of the supporting plate 147 and a threaded portion 148 integrally extended upward from the supporting plate 147 and forming the screw portion around the upper end thereof; and a head portion 151 coupled with the threaded portion 148 that is projected from the upper portion of the cross member 143 and including an adjacent member 146 to be closely contacted against the upper surface of the supporting plate 147.

The pressure adjusting portion 132 comprises a lower portion 152 forming a lower flange to couple with the upper flange of the outer air inflowing portion 131 and forming a double hollow space to receive the head portion 151 of a sealing member 149 and an upper portion 153 extended to have a smaller diameter from the upper portion 152, in the inner of which a hexagonal body formed to receive hexagonal nut and on the outer circumference of which a threaded portion is formed.

A rotational portion 155 comprises a rotator 156 screwed to the threaded portion of the upper portion 153 to move up and down along the length portion thereof, a moving member 158 mounted in an inner wall which is extended downward to have a predetermined diameter from the upper center of the rotator 156 and coupled with a driving shaft of a micro motor 160 and a rotating screw portion 157 fixed to the lower of the moving member 158, on the outer circumference of which the hexagonal nut 154 is rotatable mounted, and including a screwed member 159 inserted into a threaded hole at the center of the head portion 151.

Therefore, as the pressure adjuster 140 is assembled in one unit and operated, the operating force of the micro motor 160 rotates the rotator 156 and the moving member 158 shafted to the micro motor 160 at the same time. This rotates the hexagonal nut 154 coupled into the hexagonal body of the upper portion 153. In this case, the rotation of the hexagonal nut 154 moves the threaded portion 157 and the threaded member 159 upward and downward and at the same time. Thereby, the pressure adjuster 140 controls the up and down movement of the valve 150 including the head portion 151.

Figure 7:
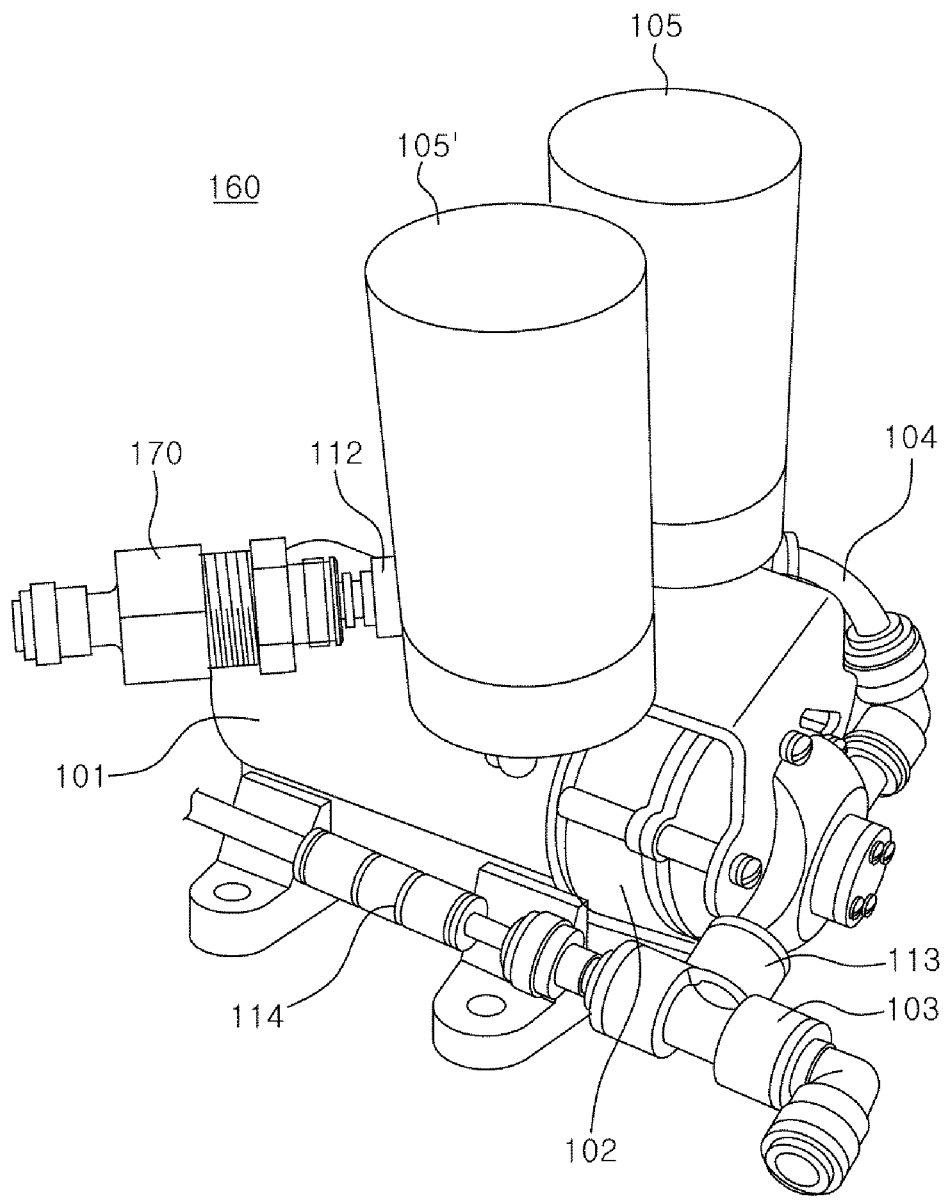
FIG. 7 is a perspective view illustrating the assembly of the important parts in a nano-bubble water generating apparatus containing an application gas to be used for a home appliance according to another embodiment of the invention.

FIG. 7 is showing another embodiment of the invention configured to be suitable for the home appliance. For this purpose, a nano-bubble water generating apparatus 100 comprises two smaller pressure tanks directed to each another to uniform the pressure in the pressure tanks still more and uniformly produce a nano-bubble water in which a specific gas or application gas is resolved. Except for two pressure tanks, the configuration according to this embodiment is similar to that of a first embodiment. Therefore, the same number to the same parts is referenced for the brief of the explanation.

According to another embodiment, the nano-bubble water generating apparatus 100 includes a pump 102 coupled adjacent to a motor 101. The pump 102 induces a liquid, for example water from an inlet pipe 103 and outer air, for example a specific gas such as Air, Oxygen, Hydrogen, Nitrogen, etc. through a gas mixing pipe 113 to have a predetermined pressure and then feed it into two pressure tanks 105 and 105' in turns. The two pressure tanks 105 and 105' are directly coupled to each another through a pipe (not shown) to the lower thereof and includes a nano-bubble water generating tube mounted therein, its detailed explanation being omitted.

The nano-bubble water generating apparatus 100 also comprises a pressure adjuster controlling a pressure in the pressure tank 105 by feeding an outer air or a specific gas and a control portion all system including the pressure adjuster, the detailed explanation of which is omitted.

Therefore, the nano-bubble water generating apparatus 100 supplies water from an outside and outer air or hydrogen, oxygen, etc. from a pressure adjuster (not shown) through the mixing pipe 113 to the pump 102, so that the pressure in the pressure tank 105 is controlled. The pressure tank 105 shatters mixed bubble water containing outer air and water still more in minute size particles, so that fine nano-bubble water is produced. The nano-bubble water is discharged through the discharging pipe 112 connected to the pressure tanks and passed through a nano-bubble water outputting tube 170, finally. The nano-bubble water outputting tube 170 processes the nano-bubble water passing there through to shatter it in a more minute size as described later in detail.

Figure 8:
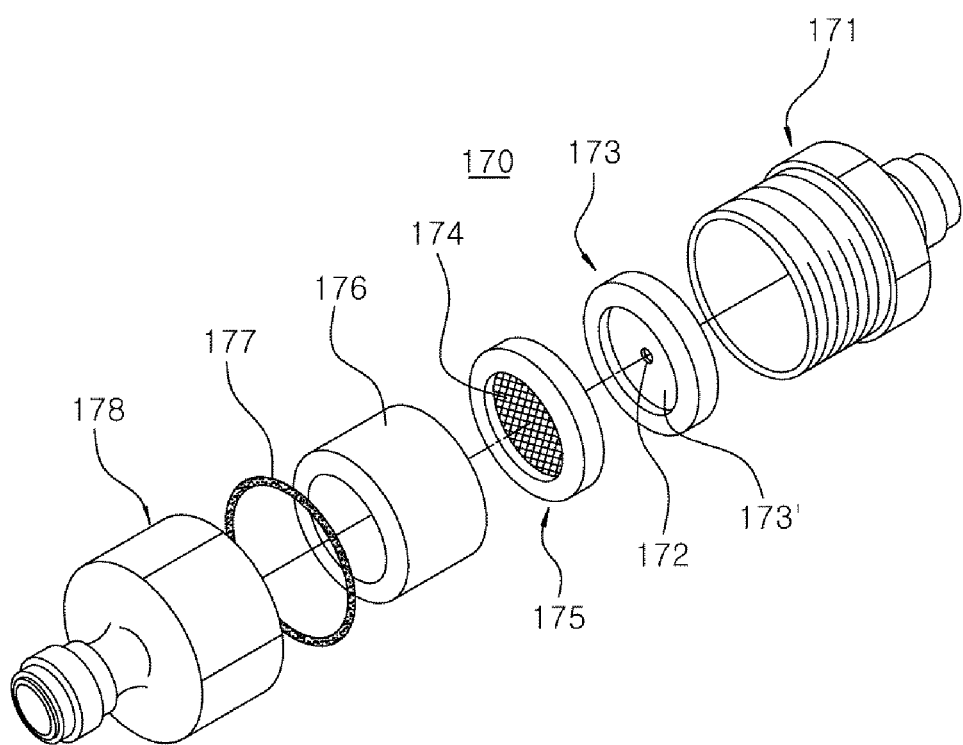
FIG. 8 is an exploded perspective view illustrating a nano-bubble water outputting tube of the nano-bubble water generating apparatus containing an application gas to be used for a home appliance according to another embodiment of the invention.

As shown in FIG. 8, a nano-bubble water outputting tube 170 finally expands and shatters the nano-bubble water from the pressure tank 105 to be formed in a still smaller nano-size.

The nano-bubble water outputting tube 170 has a configuration similar to that of the shattering structure 50 of a first embodiment as shown in FIG. 5 and comprises a second main body 171 connected to a discharging pipe 112 at one end thereof, on the outer circumference of which a screwed portion is formed; a third retainer 173 including a frame made of an elastic material such as silicon, etc. to surround a circular metal plate 173', at the center of which a second orifice 172 is formed, a fourth retainer 175 including a frame made of an elastic material such as silicon, etc. to surround a fine metal net 174 and finely shatter diffused nano-bubble water and an outputting portion 178 including a cylindrical ring 176 of a predetermined length for diffusing shattered nano-bubble water, again, and a narrowed end for strongly outputting nano-bubble water and a sealing ring 177 inserted and sealed therein with being coupled to the threaded portion of the second main body 171, the end portion of which is narrowed. Herein, the third retainer 173, the fourth retainer 175 and the cylindrical ring 176 are positioned in the second body and the outputting portion 178 threaded to each other in turns to process the nano-bubble water.

Figure 9:
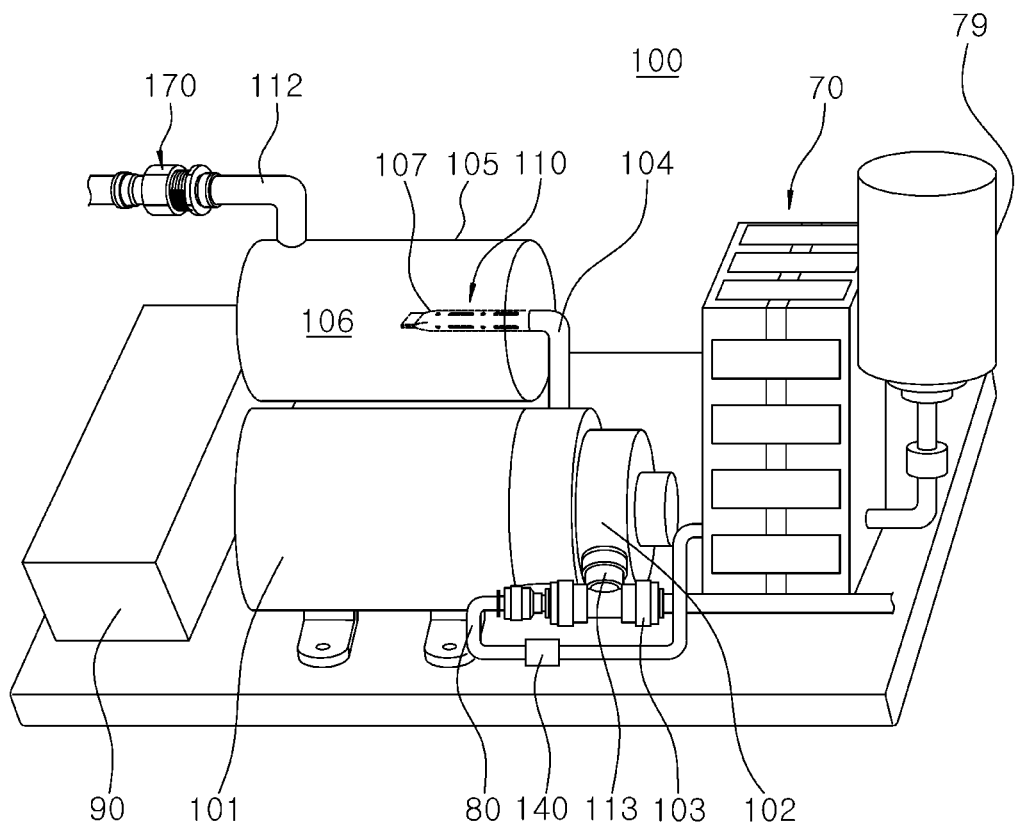
FIG. 9 is a perspective view illustrating the assembly of the important parts in a nano-bubble water generating apparatus containing an application gas provided with a first electrolytic gas generating portion to generate an oxygen or hydrogen gas according to another embodiment of the invention.
Figure 10:
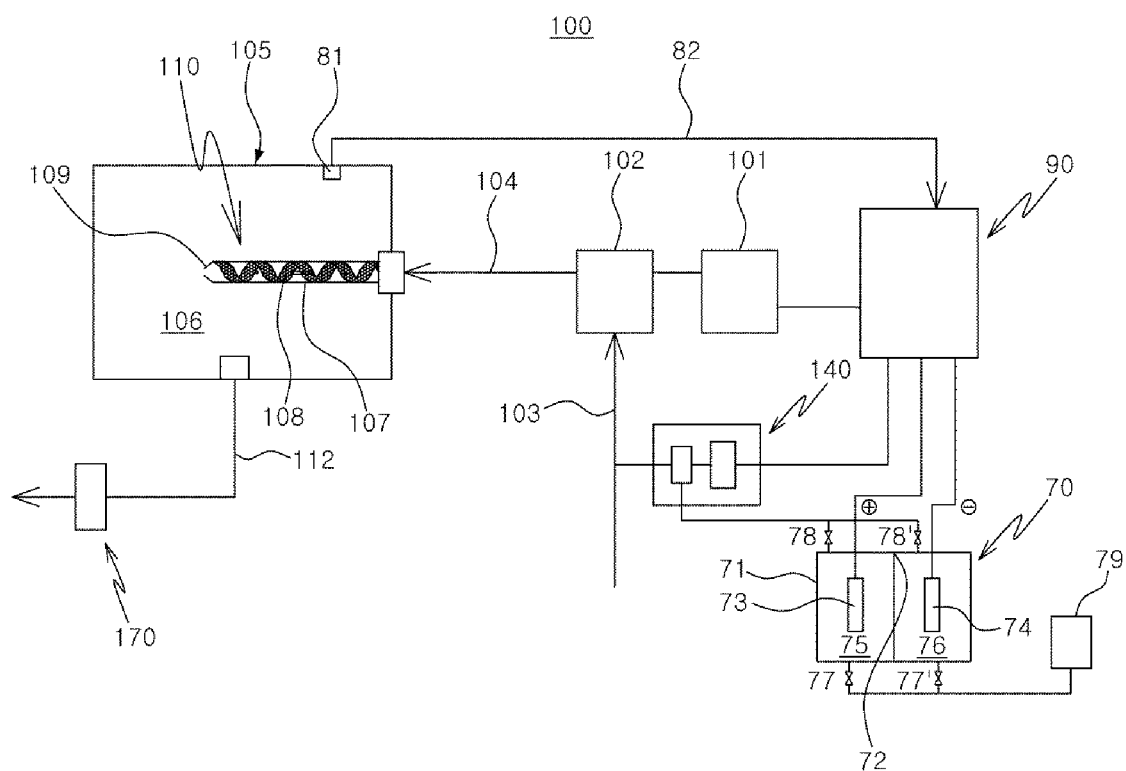
FIG. 10 is a block diagram illustrating a nano-bubble water generating apparatus containing an application gas provided with the first electrolytic gas generating portion to generate an oxygen or hydrogen gas according to another embodiment of the invention; and, FIG. 11 is a block diagram illustrating the configuration of a second electrolyte gas generating portion of a nano-bubble water generating apparatus containing an application gas provided to generate oxygen or hydrogen gas according to another embodiment of the invention.
Figure 11:
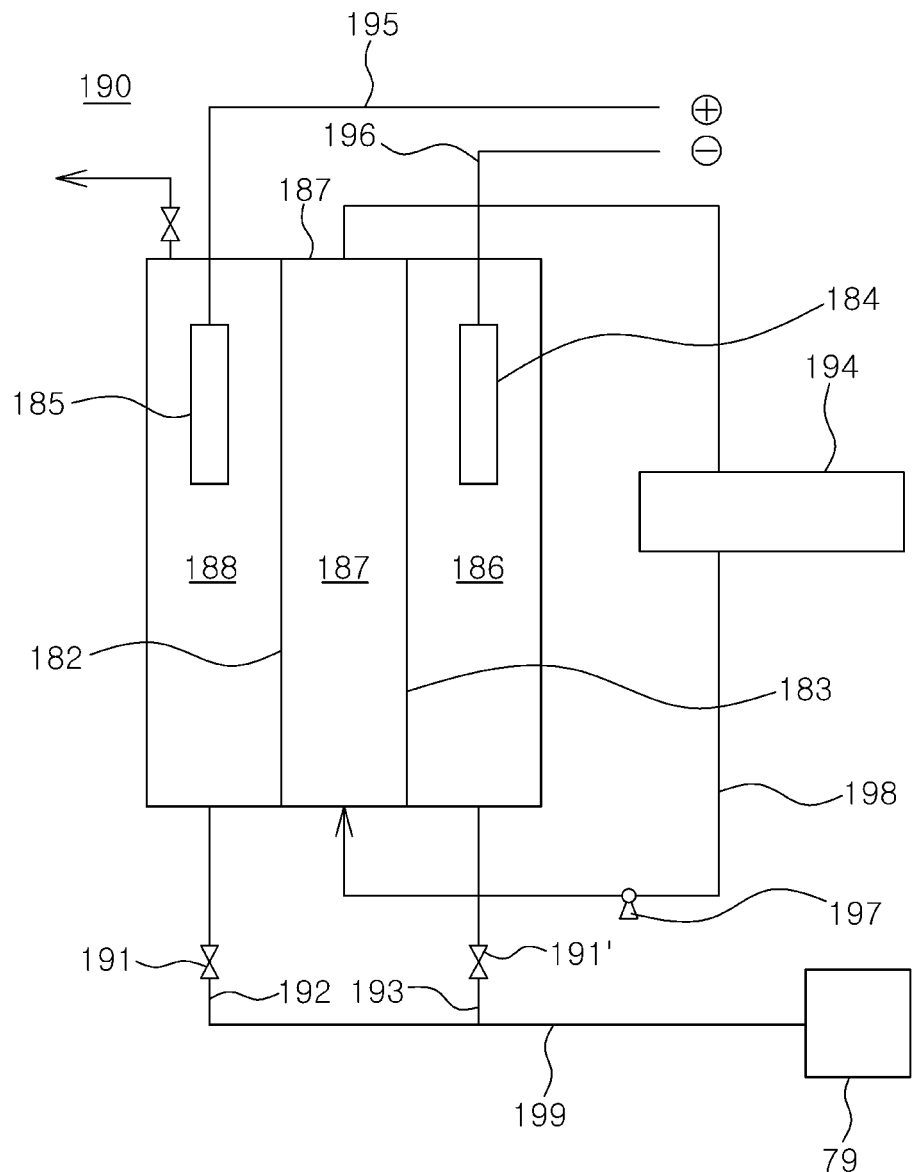

Another embodiment of the invention is drawn in FIGS. 9, 10, 11, the configuration of which is similar to a first embodiment. Thereafter, to the same parts the same numbers are referenced, the detailed description of which is omitted.

According to another embodiment of the invention, a nano-bubble water generating apparatus 100 comprises a pump 102 coupled adjacent to a motor. The pump 102 supplies a liquid, typically water, from an inlet pipe under a predetermined pressure through a supplying pipe to a pressure tank 105. A nano-bubble generating tube 110 is fixed to a water inlet port of the pressure tank 105. The nano-bubble generating tube 110 is the same as a prior registered fine water generator, in which a hollow pipe 107 having a length somewhat shorter than an inner full length of a vacuum chamber 106 is horizontally mounted. The configuration of the nano-bubble water outputting tube 170 is same as that of the first embodiment, the detailed description of which is omitted.

Nano-bubble water generated at a pressure tank 105 passes through a discharging pipe 112 and a nano-bubble water outputting tube 170 in turns. The nano-bubble water outputting tube 170 is the same as the configuration of the embodiment as shown in FIG. 8, the detailed description of which is omitted.

On the other hand, the nano-bubble water generating apparatus 100 further comprises a pressure adjuster 140 for controlling the vacuum chamber 106 in the pressure tank 105 with outer air or specific gases to be supplied as described in detail later and an electronic control portion 90 for controlling a total system including the pressure adjuster 140. Herein, the system may comprise the pressure adjuster 140 as disclosed in the first embodiment or a valve for adjusting an amount of gas to be supplied through a gas feeding pipe 80. The electronic control portion 90 receives a pressure sensing signal through an inputting line 82 from a sensor 81 to sense the pressure of the pressure tank 105.

The nano-bubble water outputting tube 170 finally expands and shatters the nano-bubble water passing through the discharging pipe 112 from the pressure tank 105 to be more fine particles. The pressure adjuster 140 adjusts the pressure in the vacuum chamber 106.

Only, the pressure adjuster 140 may be combined with any one of a first electrolyte gas generating portion 70 of a two compartment cell type and second electrolyte gas generating portion 190 of a three compartment cell type, in which the first electrolyte gas generating portion 70 and the second electrolyte gas generating portion 190 are constituted as an electrolyte device. The first and second electrolyte gas generating portions 70 and 190 each comprises a storage tank 179 for supplying raw water in common.

As shown in FIG. 10, the first electrolyte gas generating portion 70 comprises a dielectric diaphragm electrolyte cell 71 of a two compartment type, in the center portion of which a dielectric diaphragm 72 is mounted. In the dielectric diaphragm electrolyte cell 71 a first anode chamber 75 installing a first anode 73 and a second cathode chamber 76 installing a first cathode 74 are constructed on both sides of the dielectric diaphragm 72. To the first anode chamber 75 and the first cathode chamber 76 sodium chloride liquid and mixing liquid with water or raw water, which is pure water, are selectively supplied trough first and second inflowing valves 77, 77' from the storage tank 79.

The electrolyte gas generating portion 70 generates oxygen gas ($O_2$) and hydrogen ion ($H^+$) from water ($H_2O$) at the first anode 73 in the anode chamber 75 and on the contrary hydrogen gas ($H_2$) and hydroxide ion ($OH^-$) at the first cathode 74, when water is electrolyzed. Therefore, in order to collect the oxygen gas ($O_2$) and discharge it through the first discharge valve 78 raw water is supplied from the storage tank 79 to the anode chamber 75. On the other hand, in order to collect the hydrogen gas ($H_2$) and discharge it through the second discharge valve 78' raw water is supplied from the storage tank 79 to the cathode chamber 76. At the same time, as the oxygen gas ($O_2$) or the hydrogen gas ($H_2$) is supplied into the pump 102 passing through the pressure adjuster 140 and the inlet pipe 103, the mixing water with the hydrogen or oxygen gas is supplied under a predetermined pressure to the pressure tank 105 so that oxygen nano-bubble water resolving the oxygen gas or hydrogen nano-bubble water resolving the hydrogen gas is generated.

Similarly, as shown in FIG. 11, a second electrolyte gas generating portion 190 is constructed as an electrolyte apparatus of a three compartment cell type, which comprises a cathode chamber and an anode chamber that are an electrolyte cell and an immediate chamber positioned there between, into which an aqueous solution of an electrolyte such as a salt (NaCl) water, etc. is charged. The anode chamber includes an anode electrode therein and is separated from the intermediate chamber by a diaphragm film made of a porous polymer. The cathode chamber includes a cathode electrode therein and is separated from the intermediate chamber by a diaphragm film made of a porous polymer.

The configuration allows a water to be circulated passing through the cathode chamber and/or the anode chamber as well as the electrolytic aqueous solution to be moved to adjacent chambers passing through the intermediate chamber. At that time, as predetermined positive and negative direct currents are applied to each of the anode and cathode, the oxygen gas ($O_2$) is generated in the anode chamber and the hydrogen gas ($H_2$) is generated in the cathode chamber.

That is to say, the second electrolyte gas generating portion 190 comprises a cathode chamber 186 accommodating a second cathode 184 therein, an intermediate chamber 187, an anode chamber 188 accommodating a second anode 185 therein and ion selective diaphragms 182 and 183 separating the cathode chamber 186, the intermediate chamber 187 and the anode chamber 188 from each another. The DC power source is applied through power lines 195 and 196 to the second cathode and anode 184 and 188 at the same time.

Raw water stored at the storage tank 79 is supplied to the second and cathode and anode chambers 186 and 185, selectively, through first and second water lines 191 and 191' branched off from a common supplying pipe 199 based on the operation of first and second inflowing valves 191 and 191'. Electrolyte solution made at the electrolyte storage tank 194 is pumped by a circulating pump 197 to supply through a circulating pipe 198 to the intermediate chamber 187 for the circulation flowing.

Therefore, the oxygen gas ($O_2$) and the hydrogen gas ($H_2$) each is supplied through the pressure adjuster 140 and the pump 102 to the pressure tank 105, while raw water mixed with any one of these gases is made into a large amount of oxygen nano-bubble water resolving oxygen or a large amount of hydrogen nano-bubble water resolving hydrogen.

As described above, the invention enables the production of the alkaline hydrogen nano-bubble water or weak acid oxygen nano-bubble water according to the use purpose of an application gas. Besides, if nitrogen gas is supplied through another gas supplying pipe, a large amount of nitrogen nano-bubble water resolving nitrogen can be produced.

The invention can be adapted to a nano-bubble water purifier, a nano-bubble foot baths, a nitrogen nano-bubble water generator for gardening, an agricultural water generator in an industrial field, a nano-bubble washer for laundry of clothes, an oxygen generator for supplying oxygen to a fish farm or a washer for washing vegetables or fruits.

The invention claimed is:

1. A nano-bubble water generating apparatus containing an application gas provided with a motor, a pump integrated with the motor for supplying liquid from an inlet pipe under a predetermined pressure through a supplying pipe to a pressure tank, a nano-bubble water generating tube directly connected to a water inflowing port of the pressure tank, in which a hollow pipe is horizontally mounted to have a height smaller than a inner full length of a vacuum chamber and a threaded net member inserted thereinto, a nozzle hole formed at the one end thereof and a plurality of fine nozzle holes in various shapes around the circumferential wall thereof, a pressure adjuster including an outer air inflowing portion to introduce an outer air or a specific gas and a pressure adjusting portion airtightly coupled on the upper portion of the outer air inflowing portion to adjust an amount of outer air or specific gas, and an electronic control portion for controlling all systems, comprising:

the pressure adjuster, comprising the outer air inflowing portion including a cup portion, a space formed at its center, an inflowing passage connected to an inlet pipe to introduce outer air into the space, an outputting passage formed to output the outer air through an outputting pipe, a cylindrical inducing tube forming a spring seat and a nozzle at the center in a body of a predetermined height to communicate the inflowing passage with the outputting passage, a supporting plate mounted on a shoulder around the upper circumference of the outer air inflowing portion, and a sealing member closing/opening the nozzle formed in an outer air inducing tube to introduce outer air or specific gas into the pressure tank so that uniform pressure is maintained;

the pressure adjusting portion including a lower portion forming a lower flange to be coupled with an upper flange of the outer air inflowing portion and forming a double hollow space to receive a head portion of a sealing member; an upper portion extended in a smaller diameter from the upper portion, an inner surface of the upper portion defines a hexagonal body to receive a hexagonal nut and on the outer circumference of which a threaded portion is formed; a rotational portion including a rotator screwed to the outer threaded portion of the upper portion to move up and down along the length portion thereof; a moving member coupled with a driving shaft of a micro motor which is provided on the upper portion of the rotator and mounted in an inner wall which is extended downward from the inner center of the rotator; and a rotating screw portion coupled to a lower portion of the moving member, on the outer circumference of which the hexagonal nut is rotatably mounted, and including a screwed member inserted into a threaded hole at the center of the head portion;

a valve provided with a supporting plate positioned on the upper circumference of the cup portion to seal the space and define the boundary between the outer air inflowing portion and the pressure adjusting portion for adjusting an amount of outer air or specific gas to be supplied; and a nano-bubble water including a volume portion for expanding tube expanding nano-bubble water passing through an outlet pipe from the pressure tank and shattering members for shattering nano-bubble water, so that the nano-bubble water is better micronized.

2. The nano-bubble water generating apparatus containing an application gas as claimed in claim 1, in which:

the sealing member including a leg portion having a pointed end to close/open the nozzle with being inserted into the outer air inducing tube along with the spring, a cross portion elastically supported by the spring rightly adjacent to the lower of the supporting plate and a threaded portion integrally extended upward from the supporting plate and forming the screw portion on the upper end thereof; and a head portion coupled with the threaded portion that is projected from the upper portion of the cross member and including an adjacent member closely contacted against the upper surface of the supporting plate.

3. The nano-bubble water generating apparatus containing an application gas as claimed in claim 1, in which:

the nano-bubble water expanding tube includes an inlet portion hollowed therein;

a volume portion threaded to the outside of the inlet portion provided with an intermediate wall formed on the inner portion thereof, at least two holes perforated on the intermediate wall;

shattering members mounted into the holes to expand and shatter the nano-bubble water, thereby being made in a more minute size; and, an outlet portion thread-coupled with the volume portion and including an outlet port of a small diameter narrowed from a volume in a same size adjacent to the volume portion.

* * * * *